(No Model.)
T. J. HOWELL.
GALVANIC BATTERY.
No. 246,953. Patented Sept. 13, 1881.
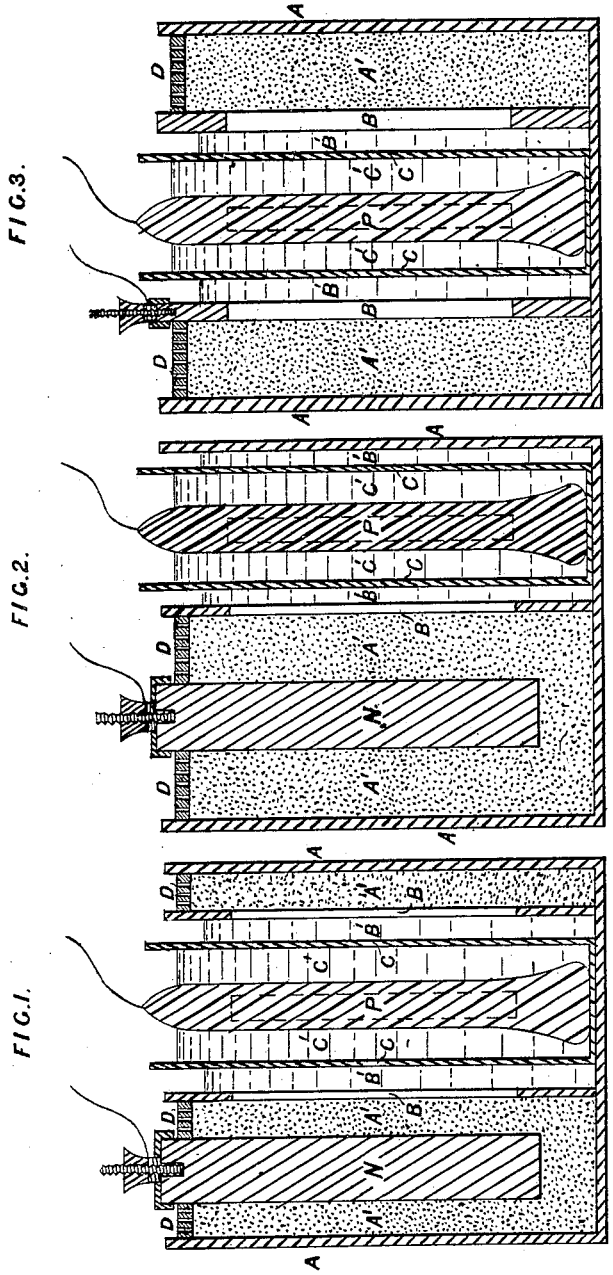
Witnesses.
Inventor
Thomas James Howell

UNITED STATES PATENT OFFICE.

THOMAS J. HOWELL, OF DEVONSHIRE PLACE, UPPER KENNINGTON LANE, LONDON, COUNTY OF SURREY, ENGLAND.

GALVANIC BATTERY.

SPECIFICATION forming part of Letters Patent No. 246,953, dated September 13, 1881.

Application filed February 11, 1881. (No model.) Patented in England March 14, 1879, and in France August 28, 1879.

*To all whom it may concern:*

Be it known that I, THOMAS JAMES HOWELL, of Devonshire Place, Upper Kennington Lane, London, in the county of Surrey, England, have invented certain new and useful Improvements in Galvanic Batteries Applicable to Telegraphic and other Purposes, of which the following is a specification.

My invention consists in a galvanic battery constructed in a manner that greatly facilitates the cleaning of the battery and the keeping of its resistance at its normal low value; in sealing up the outer compartment of the battery with its contents for safety in transit; and, lastly, in the increase of electro-motive force, which I obtain under conditions described farther on.

The battery consists of a cell of glass, porcelain, earthenware, or other suitable material, divided into an inner and outer compartment by a cell or separator. The separator-cell, which may be either with or without a bottom, and of the same material as the outer cell, or of carbon, wood, or other suitable material, extends to the same height as the outer jar, and is provided with narrow longitudinal slots sufficient to permit of the free circulation of the fluid contained in the inner compartment, but to exclude the mixture contained in the outer compartment. Inside the separator is placed an ordinary porous cell, thus forming three compartments. It is obvious that the outer jar, the separator, and the porous cell may be made circular, square, oblong, or of any shape found in practice to be most convenient, and they may be all made of the same shape or each of different shapes. Instead of having the separator in the form of a tube or cell, it may consist of a fixed or movable slotted partition or plate extending across the outer jar. In this case the outer jar and the porous cell would preferably be square or oblong. In the outer compartment, or the compartment formed by the outer jar and separator, is placed an ordinary plate, block, or rod of carbon or graphite, which constitutes the negative electrode. When the separator is made of carbon no block of carbon is required. In the outer compartment surrounding the carbon or graphite plate and the separator I then place a mixture made up of ordinary peroxide of manganese and broken charcoal or graphite; also a quantity of sulphate of manganese, known commercially as "white manganese." For safety in transit I may seal over the before-mentioned mixture with some suitable compound—such as marine-glue, pitch, or any suitable material—in which I make perforations to admit of the escape of gases, which perforations will also admit of a supply of saturated manganese being poured into the outer compartment when the battery is found to be weakening. In the middle compartment, formed by the slotted separator and the porous cell above mentioned, I place a solution of sulphuric or nitric acid and water, which penetrates the slots in the separator and impregnates the mixture of manganese and carbon. For the positive electrode in the porous cell or inner compartment I place a rod or plate of zinc. This rod or plate of zinc is amalgamated with mercury, (quicksilver,) and a small quantity of the mercury (quicksilver) is placed in the porous cell to keep up the amalgamation. In the compartment of the porous cell containing the zinc rod or plate I place a solution of sulphate of ammonia—$(NH_4)_2SO_4$—and water; or, instead of placing the sulphuric or nitric acid solution in the middle compartment, I may place it inside the porous cell, and the solution of sulphate of ammonia in the middle compartment; but I prefer to place the solution as first described.

In the accompanying drawings, which show my invention, Figure 1 is a vertical section through the center of a round cell embodying my invention; Fig. 2, a similar view of a square cell, also embodying my invention; and Fig. 3 a vertical section through the center of a square cell where no block of carbon is required.

In the accompanying drawings, A is the outer jar; B, the slotted separator-cell, which is shown as a tube in Figs. 1 and 3, and as a partition or plate in Fig. 2; and C, an ordinary porous cell.

N is the negative electrode, which consists of a block of carbon having a suitable binding-screw for connecting purposes, firmly attached to the top. In Fig. 3 the rod N is replaced by the carbon-separator cell B, which in this case constitutes the negative electrode.

P is the positive electrode, consisting of a zinc plate.

A' is the compartment containing the mixture of peroxide of manganese, broken graphite, and sulphate of manganese. D is the seal that keeps the mixture in place.

B' is the compartment which contains the mixture of sulphuric or nitric acid and water, and C' is the compartment which contains the solution of sulphate of ammonia and water.

I am aware that peroxide of manganese is used in galvanic batteries, but not, as in my invention, with the addition of sulphate of manganese or white manganese, which has the effect of keeping the connection between the carbon or graphite plate more perfect with the manganese and carbon mixture above mentioned.

I claim as my invention—

1. The combination, in a galvanic battery, of sulphate of manganese, with peroxide of manganese and carbon.

2. The combination, in a galvanic battery, of electrodes, a mixture of peroxide of manganese, sulphate of manganese, and broken carbon, sulphate of ammonia, and sulphuric acid, as set forth.

3. The combination, in a galvanic battery having a slotted separator and porous cell, of the electrodes, a mixture of peroxide of manganese, sulphate of manganese, and broken carbon, sulphuric acid, and a solution of sulphate of ammonia.

4. The combination, in a galvanic battery, of an outer cell, a slotted cell, a porous cell, electrodes, a mixture of peroxide of manganese with broken carbon or graphite, sulphuric acid in aqueous solution, or its equivalent, and sulphate of ammonia in aqueous solution, substantially as described.

5. The combination, in a galvanic battery, of an outer cell, a slotted cell, a porous cell, a mixture of peroxide of manganese with broken carbon or graphite, a perforated seal, electrodes, sulphuric acid in aqueous solution, or its equivalent, and sulphate of ammonia in aqueous solution, substantially as and for the purpose described.

THOMAS JAMES HOWELL.

Witnesses:
JOHN DEAN,
J. WATT,
Both of 17 Gracechurch St., London.